Nov. 22, 1966  R. K. PLEBUCH  3,286,468
NUCLEAR ROCKET REACTOR

Filed Sept. 5, 1963  4 Sheets-Sheet 3

Fig-3-

INVENTOR
Richard K. Plebuch

United States Patent Office 3,286,468
Patented Nov. 22, 1966

3,286,468
NUCLEAR ROCKET REACTOR
Richard K. Plebuch, Watertown, Mass.
(28563 Blythewood Drive, Palos Verdes Peninsula, Calif.)
Filed Sept. 5, 1963, Ser. No. 306,911
10 Claims. (Cl. 60—203)

This invention relates generally to the nuclear rocket art and is particularly concerned with the support of internal solid cores of high temperature, nuclear rocket reactors which serve as the heat source for the nuclear powered rocket.

The nuclear powered rocket exhibits a potential superiority over chemically powered rockets due to the method of producing the energy required for the propulsion of such vehicles. As is well known, a chemical rocket derives its energy requirements from the combination of relatively high molecular weight propellants, whereas, the nuclear rocket generates its energy requirements by the fission process and, thus, is not dependent on the combustibility of the propellant. Therefore, a nuclear rocket with a nuclear reactor heat source can utilize low molecular weight gases, such as hydrogen or helium, as propellants. Since the specific impulse, thrust per unit weight of propellant varies inversely with the square root of the molecular weight of the working fluid and directly with the square root of the temperature of the fluid emerging from the heat source, a nuclear rocket employing hydrogen as a propellant and operating at temperatures comparable with those achieved by combustion would have a specific impulse significantly greater than that obtainable by any chemically powered rocket vehicle.

Due to the nature of any rocket component, especially a nuclear rocket reactor where minimum weight is so essential, the maximum performance from each component is the goal of the designer. However, maximum performance is only attained from a design in which the components are extended to their material limits. The design of the nuclear rocket reactor is a striking example of a component in which the materials of present technology are extended as close to their physical limits as possible. As was pointed out earlier, the higher the exit propellant temperature, the higher the thrust per unit weight of propellant. It is therefore desirable to utilize the strongest materials with the highest melting points and with desirable nuclear properties for the construction of the nuclear reactors and to operate these materials at as high a temperature as is physically possible without destroying the reactor. With the reactor operating at the extremes of material limits, the major problem which arises concerns the support of the nuclear rocket reactor during operation. In the words of Dr. R. W. Bussard and Dr. R. D. De Lauer in their recent book entitled "Nuclear Rocket Propulsion," they state that:

"This internal core support structure poses the most difficult problem in the reactor structural design. It must live in an environment of very hot, corrosive propellant gas, and it must carry the pressure drop and any differential-expansion loads of the core. It must itself be cooled sufficiently to remove the internally deposited gamma heat energy, and must not be so distorted by various thermal gradients and loads imposed on it that the fuel-element design geometry is changed in any significant way. This is a difficult requirement, since total core loads can be extremely high in some specific designs. For example, a pressure drop of 200 lb./in.$^2$ across a 3-ft.- diameter cylindrical reactor core yields a total load of about 100 tons which must be transmitted by the core support structure to the outer pressure shell."

Since the majority of construction materials can withstand significantly higher structural loads under compression than under tension, it is desirable and is usually necessary during operation to support the fuel elements of the nuclear rocket under compressive loadings. This is necessitated if the element is to operate without failure near its maximum temperature, where its structural strength is greatly reduced. Due to the significant thermal expansion which the rocket reactor core undergoes in coming up to the operating core temperature, another criteria which is met is that the core is free or unrestricted as far as practical concerning thermal expansion.

The commonly accepted methods of support, such as support beams or supporting arches on which the core would rest, or support beams at the reactor coolant-propellant inlet with the tie rods through the core which then rest on bearing plates connected to the tie rods, all have the inherent disadvantage that if the core is to be supported in compression the structural member, or a portion of the structural member, is under loading at the hottest portion of the core. These structural members must be cooled and even with reasonable cooling operate at relatively high temperatures where their structural strength is significantly reduced. This means that larger and, thus, heavier members are required than if the support could be provided at the colder inlet end of the rocket reactor. The cooling of these members represents a difficult design problem to say nothing of the effect of the presence of such members at the propellant outlet end of the core or in the core itself, on the performance of the nuclear rocket reactor. Such members seriously degrade the performance of the rocket reactor by perturbing the flux or cooling the propellant.

Confronted with the enumerated requirements and realizing the deficiencies of the commonly accepted methods of providing the internal core support of nuclear rocket reactors, the inventor takes advantage of the high propellant pressure at the propellant exit end of the rocket reactor to provide the compressive loading necessary to support the reactor fuel elements during operation. Therefore, the basic principle of method and construction of the present invention is to utilize a negative pressure differential between the coolant inlet end and coolant exit end of the fuel element in order to support the element during operation.

Accordingly, it is the broad object of the present invention to provide a versatile internal core support for a nuclear reactor which provides the energy source for a nuclear powered rocket.

It is a desideratum to provide a support for the reactor in a nuclear rocket which will minimize danger of loss in whole or in part of the reactor from the rocket and thus overcome an important major problem concerning known means and/or methods of support, and particularly to attain such desired end through a pressure differential.

Another object of the invention is to provide a reactor core support which alone retains the reactor fuel elements in compression during operation and thus avoids the necessity of employing structural components at the coolant (propellant exit end of the reactor).

Still another object of the invention is to provide a form having structural support means only at the relatively cold inlet end of the reactor core and without foreign structural components passing through the reactor core.

In the drawings:

FIG. 5 is an enlarged cross-section illustrating in detail the region C of FIG. 1.

FIG. 6 is a detailed fragmentary perspective of a plate-type fuel element for a different type of reactor and supporting means therefor, and FIG. 7 is a detail vertical section of the different or plate-type of reactor fuel element and low pressure chamber therefor and its support.

Figure 1:
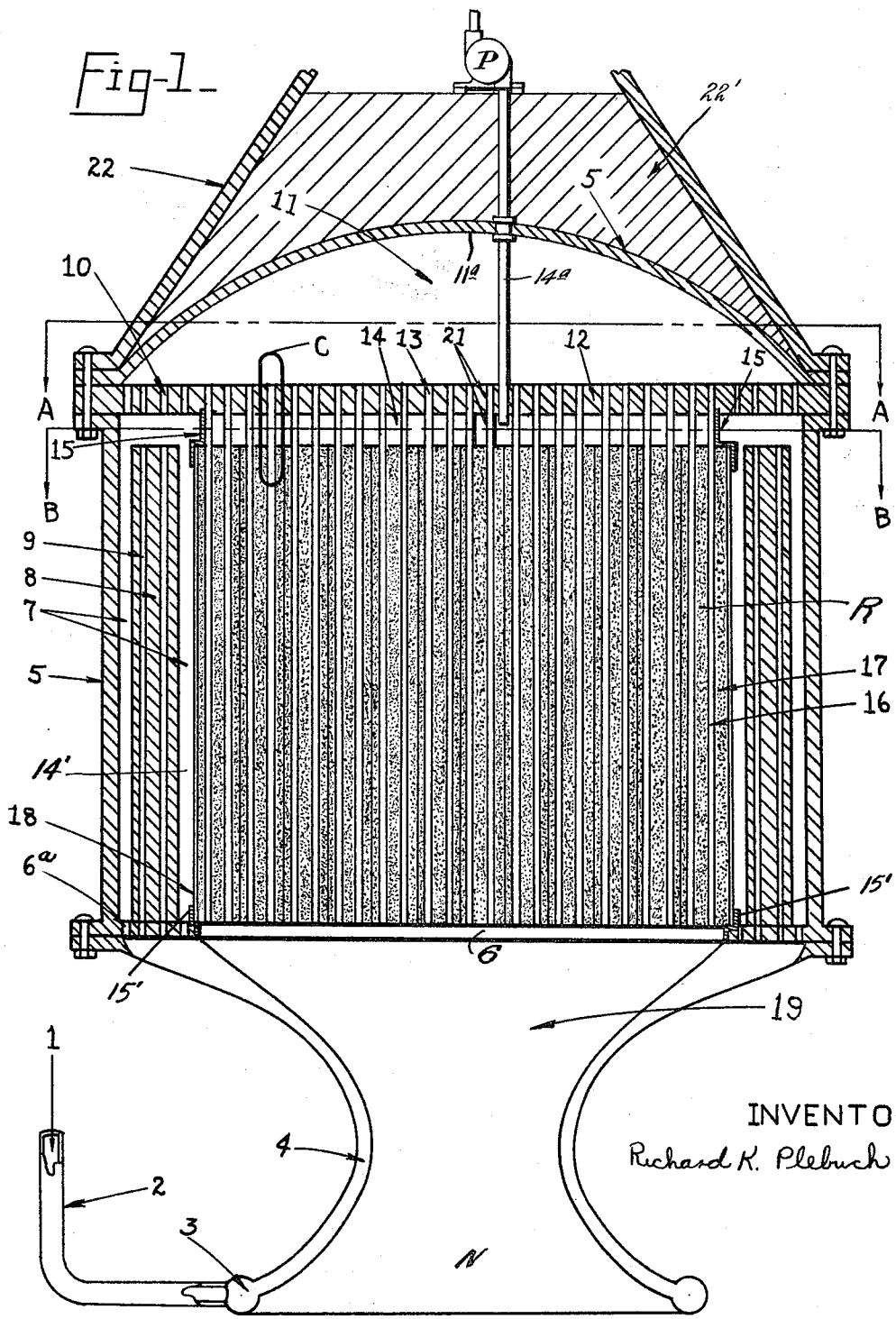
FIG. 1 is a central vertical sectional view taken through a nuclear rocket employing a nuclear reactor as its energy source, in accordance with the principles of the present invention.
Figure 2:
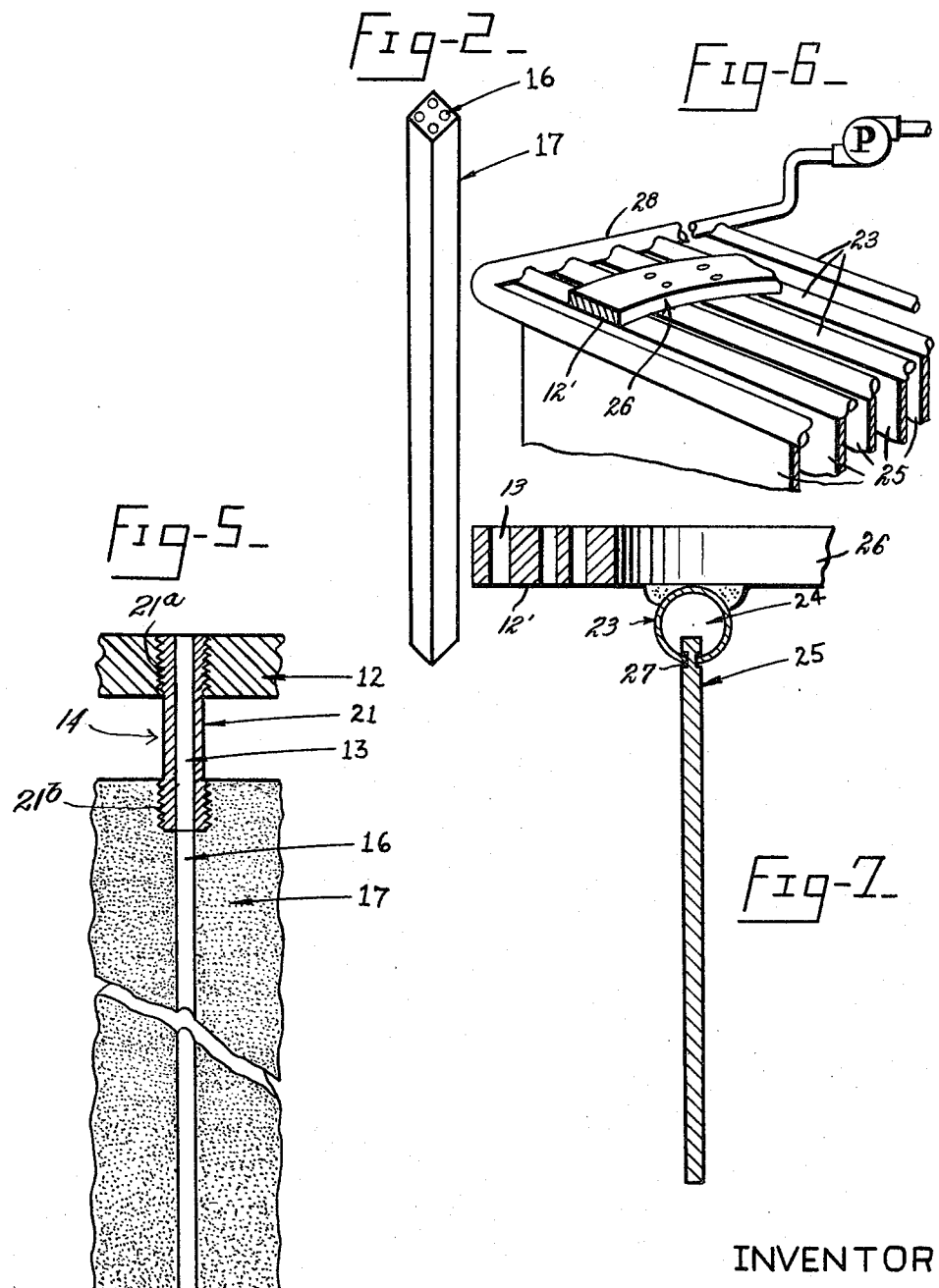
FIG. 2 is a detailed isometric perspective view of one of the fuel elements used for the reactor core shown in FIG. 1.
Figure 3:
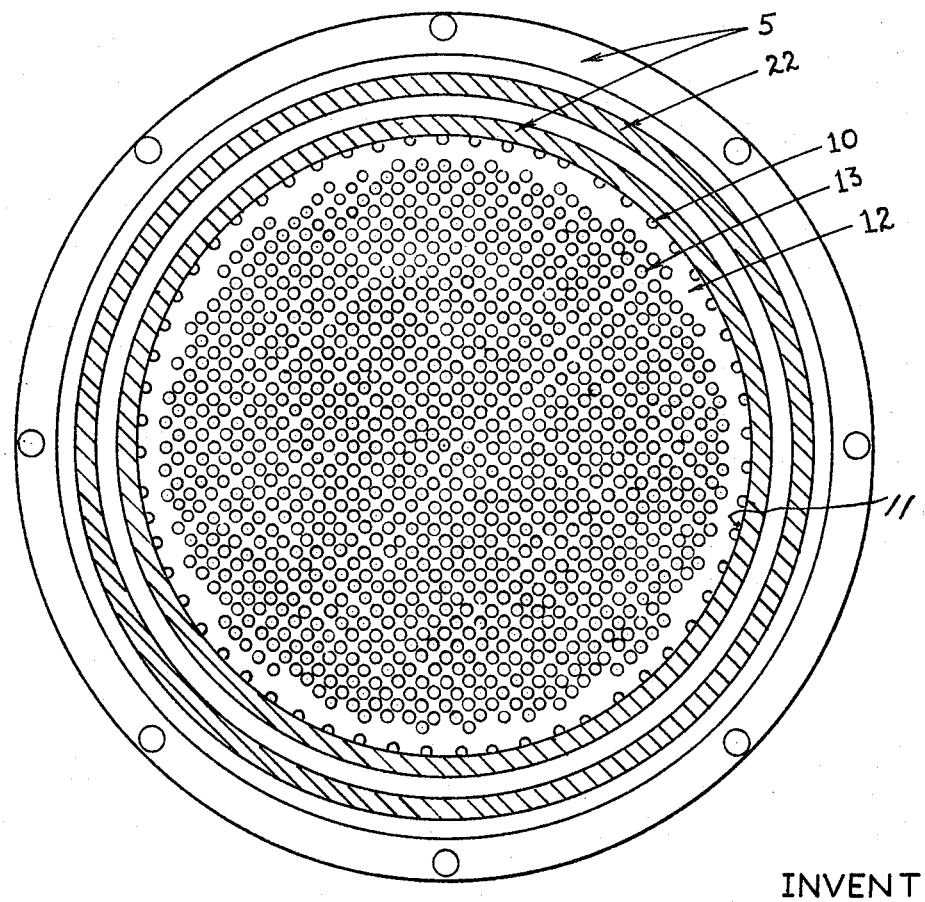
FIG. 3 is a cross-section taken along the plane of line A—A of FIG. 1.
Figure 4:
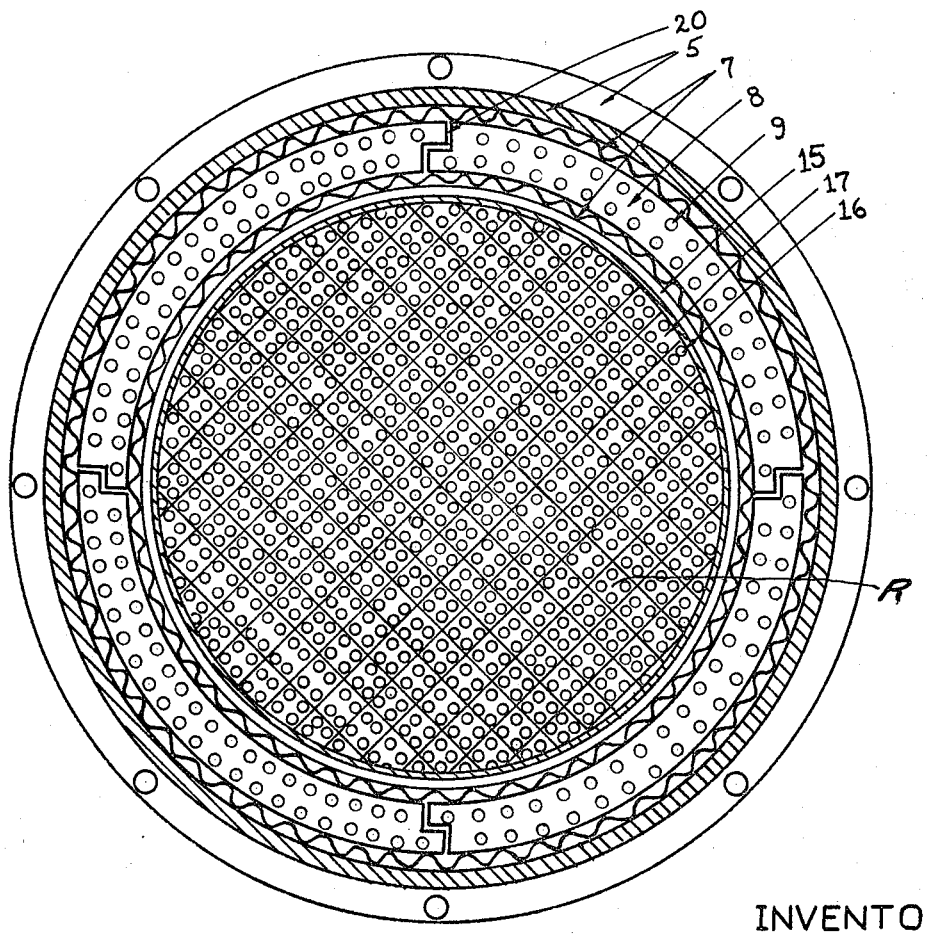
FIG. 4 is a cross-section taken along the plane of line B—B of FIG. 1.

Referring now to FIGS. 1 through 5, reference numeral 1 designates the inlet for high pressure propellant gas, such as liquid hydrogen or helium into a tube or pipe 2 from a suitable source of storage or low pressure fuel tank (not shown) being pumped from this low pressure fuel tank to above the critical pressure so that boiling will not occur in the reactor fuel body or core which is generally designated R. Said propellant at very low temperature passes through tube 2 to a collecting ring 3, and then through the thin wall tubing 4 surrounding the rocket nozzle, which is designated N in order to cool the nozzle end and prevent melting thereof. Said nozzle end is fastened to a pressure vessel 5 which contains said reactor core R.

The propellant flows through small coolant passages or openings 6ª of an end wall or base 6 of the pressure vessel 5. The end wall 6 is in the form of a ring which encompasses the outer perimeter of the reactor core R and is open in the center so that the core R is unrestricted by the ring 6. A portion of the propellant gas passes up the coolant passages 9 in a ring-shaped reflector 8 of the reactor, and the remainder passes up coolant passages formed by annular corrugated metal sheets 7 functioning to laterally support the reactor core R, and in addition to allow differential thermal expansion of said reactor core R and the reflector 8. Expansion gaps (FIG. 4) indicated by reference numeral 20 may optionally be provided to sectionalize the reflector 8 and allow for thermal expansion thereof.

A low but variable pressure chamber 14 (FIGS. 1 and 5) is provided above the reactor core R between the latter and a head or support plate 12 of the pressure vessel 5. A suitable pressure seal element 15 as of flexible metal like vessel 5 surrounds said chamber 14 and is marginally attached and sealed at its upper and lower edges respectively to head plate 12 and reactor core R to insulate the relatively cold reflector 8 from the hot reactor core R.

The seal 15 separates the low pressure chamber 14 from a high pressure chamber 14' which is formed by the interior of the vessel 15 outside of and about the core R and the seal 15. A layer 18 of insulation insulates the relatively cold reflector 8 and high pressure chamber 14' from the hot reactor core. A conduit 14ª sealed to dome 11ª and head plate 12 communicates the low pressure chamber 14 with any suitable vacuum or other pump equipment P by which the selected low pressure may be maintained in the low variable pressure chamber 14. From the coolant passages 9 and high pressure chamber 14' the still relatively cold propellant flows through coolant passages 10 of the head or plate 12 (which head is the main structural supporting means for the reactor core R as it is suspended therefrom) and collects under high pressure in a plenum chamber 11 formed by a dome 11ª of the pressure vessel 5 and the core support plate 12.

An annular seal 15' as of flexible metal like vessel 5 is marginally attached and sealed at its upper and lower portions respectively to reactor core R and end wall or base 6.

Said core support plate 12 takes the entire loading produced by the pressure drop across the reactor core in addition to the weight of the reactor core. Since the core support plate 12 is in contact with cold propellant present in plenum chamber 11, any heat produced by neutron or gamma radiation can be removed so that the support plate 12 will operate at low temperatures to obtain the maximum advantage of its structural strength. It should be clear that additional cooling of the core support plate can be provided by flowing a coolant in the low pressure chamber 14, thus effecting cooling of the support plate 12 on both sides. This is a significant attribute of the present invention because materials lose strength at high temperature and any structural member at the propellant exit end 19 of the core has to be substantially larger and therefore heavier to withstand the same loads.

From the plenum chamber 11 the propellant travels through coolant passages 13 at the radially inner region of support plate 12. Said coolant passages 13 are provided by small thin wall tubes 21 as detailed in FIG. 5, which connect the plenum 11 with cooling passages 16 extending through reactor fuel elements 17 which make up the reactor core R. The passages 16 communicate at their lower ends with the zone 19 through the open center of the ring 6. The said tubes 21 at opposite ends are screw-threaded at 21ª, 21ᵇ, or otherwise attached to the support 12 and the elements 17, thus bridging the low pressure chamber 14 and separating all paths of the high pressure propellant from the plenum chamber 11 to the core. An important factor is to feed the coolant directly into the fuel element 17 and not to allow the high pressure coolant to come into contact with the top of the fuel element, but only in contact with the support plate 12. One novelty is the pressure chamber 14 by which lower pressure is exerted on the top of the fuel element. Reactor core R may be composed of any suitable number of the said fuel elements 17. Each element 17 is channeled and for example has four channels or passages 16 therethrough and a tube 21 is provided for each passage (FIG. 5).

It is now to be emphasized that the provision of this low and/or variable pressure chamber 14 between the high pressure propellant present in the plenum chamber 11 and the top of the reactor core R constitutes an essential feature of this invention. As is well known, the propellant travels down the coolant channels 16 in the said fuel elements 17 of the reactor core R, and is heated to extremely high temperatures, and while traveling through such channels 16 experiences a pressure drop while the pressure in the exit chamber 19 remains quite high.

Typical pressures in the coolant inlet and plenum chamber are 800 to 1500 p.s.i.a.; whereas, the exit pressures commonly range from 600 to 1300 p.s.i.a. Pressure drops of 200 p.s.i.a. as mentioned in the quotation from the said book "Nuclear Rocket Propulsion" are typical. With such relatively high pressure at the coolant exit end of the reactor core, the provision of the low pressure chamber 14 enables the pressure in this chamber to be maintained below the pressure existing at the coolant exit end of the reactor. This pressure can be maintained to provide a negative pressure differential between the chamber 14 and the exit zone or chamber 19 so that the force exerted on the reactor R or body of the reactor fuel just compensates for the weight of the body of fuel and for the shearing force imparted by the coolant to the walls of the coolant passages 16 and, thus, to the fuel or reactor elements 17.

Since the reactor is only supported by or from support plate 12, this plate 12 experience the entire force resulting from the pressure drop of the propellant as it passes through the reactor core R, this load being transmitted from the core support member 12 to the pressure vessel 5 and finally to the rocket structure through its thrust structure member shown at 22. Shadow shield material 22' may be contained within member 22.

By reason of the present invention, it is very difficult, if not impossible, to lose an entire fuel element such as 17. If the element breaks, and a part of a fuel element is lost, the negative pressure differential retains the remainder of the element. The loss of a fuel element is one of the major problems confronting the present methods of support. If an element breaks away from its support, in the present designs which have a higher pressure at the inlet than at the outlet of the core, they tend to eject the element from the reactor leaving a large gap through which the coolant then flows. This is a very serious problem since it leads to the destruction of the reactor.

When the rocket reactor R is not in operation, such as would be the case if the nuclear rocket was an upper stage vehicle of a ground-launched, chemical or nuclear system, the fuel elements 17 are cold and capable of withstanding nominal tensile loads, several "g's," as experienced during launching. The tensile loading experienced by reactor R at each fuel element 17 would be transmitted to the core support plate 12 by the thin-walled connecting tubes 21. The large number of thin-walled tubes 21 (one for each coolant channel 16) insures the loading per tube to be quite small depending on the number of coolant passages in each fuel element, and which number is variable according to conditions.

The control of the pressure in the low pressure chamber 14 presents no new or novel problems; hence such pressure regulating devices as are required by this invention being well understood by those skilled in the art, no particular type of control mechanism has been illustrated and described.

As far as materials of construction are concerned, in both forms of the invention, any material having good strength to weight ratio could be utilized in the construction of the parts of vessel 5, reactor core support member 12 and the thin-walled tubes 21, and for instance beryllium, which has a high strength to weight ratio and serves as an end reflector for the nuclear reactor R. Beryllium is excellent and preferred for use in thermal and intermediate reactors; but materials such as stainless steel or nickel suffice for fast reactors because of their nuclear properties.

By utilizing the principles of the present invention, a versatile internal support for the reactor core of a nuclear rocket reactor capable of retaining the reactor fuel elements in compression during operation without support mechanism at the coolant (propellant) exit end of the reactor, is realized. Finally, since the fuel is supported by a negative pressure differential between the coolant inlet end and the coolant (propellant) exit end of each fuel element 17 during operation, all structural members occur at the relatively cold inlet end or zone of the reactor and, thus, have excellent structural properties in comparison to known support means, portions of which must be located at the higher temperature coolant (propellant) exit end 19 of the reactor R.

To illustrate the applicability of the principle of the present invention to various fuel element geometries and shapes and emphasize that various changes may be made within the spirit and scope of the invention, attention is now called to FIGS. 6 and 7. Therein structure and operation unless modified as shown in FIGS. 6 and 7 and now described, is the same as with respect to FIGS. 1 to 5. In FIGS. 6 and 7 support plate 12 is supplanted by a plate 12' which is of ring shape so as to be centrally open as at 26. Welded or otherwise fastened to the under surface of plate 12' as shown, or to the upper surface of plate 12' if preferred, are horizontal tubes 23 which form auxiliary supports from which fuel plates 25 depend to a bottom plate such as 6 in FIG. 1, such tubes 23 having slots 27 receiving the upper end portions of the plates 25 and at which locations the adjacent walls of the fuel plates 25 are sealed to the tubes 23. Each tube 23 defines a low but variable chamber 24. It will be realized that the low pressure tubes 23 are spaced apart whereby coolant which is supplied above plate 12' to a chamber 11 as through openings 10 in FIG. 1, will leave such chamber through the large central opening 26 of ring 12', pass between the plates 25 and exhaust through nozzle N as in FIG. 1. However, the low pressure chamber supplanting that at 14 consists of one or a plurality of the tubes 23. Such tubes 23 lead from a manifold 28 in communication with a suitable pump means P to effect the negative pressure differential by maintaining the desired low pressure in the tube or tubes 23 above the plates 25. Said tubes 23 at their ends remote to manifold 28 are closed. It is clear that the coolant-propellant from a plenum chamber such as 11 will pass therefrom between and coact with fuel plates 25 and exit at chamber 19 and nozzle N as in FIGS. 1 to 5.

The high pressure in the zone 19 exerts a force on the base of the reactor core R if or when the pressure in chamber 14 is lower than the pressure in zone 19 by a certain amount depending on the operating conditions of the reactor. When the pressure in chamber 14 is below the pressure at zone 19 by this amount, which depends on the weight of the fuel elements and the wall shear stress imparted to the elements by the propellant, the reactor fuel elements and tubes 21 are under compression.

It is to be understood that all matter disclosed in the foregoing description and examples are illustrative only and do not limit the scope of this invention as I claim the invention as broadly as possible in view of the prior art.

What is claimed is:

1. In a nuclear reactor, a vessel having a fuel core therein, means therein from which said core is supported from above said core, said core being spaced from said means to provide a chamber, means sealing said chamber, a plenum chamber above said supporting means, means for the supply of coolant propellant through the vessel outside of said core and through said first means into the plenum chamber, means for the conduct of the coolant-propellant from said plenum chamber through said first means into said core, means to maintain a pressure lower than that of the coolant-propellant in said first chamber whereby supporting force will be exerted on said core.

2. In a nuclear reactor, a vessel having a body, a fuel core therein having passages for travel of a coolant propellant therethrough, a plate positioned above and supporting said core with a space between said plate and core to provide therebetween a chamber, means sealing said space from the remainder of the interior of said vessel, structure providing a plenum chamber on the opposite side of said plate to said core, means for the conduct of a coolant-propellant into the vessel outside of the core, through said plate and into said plenum chamber, means to conduct said coolant-propellant from said plenum chamber through said first chamber into said passages, and means to maintain the pressure in said first chamber lower than the pressure of said coolant-propellant to place a supporting force on said core.

3. A nuclear reactor according to claim 2 wherein said penultimate means are tubes screw-threaded at opposite ends to said plate and fuel core.

4. A nuclear reactor according to claim 2, wherein said vessel at the end of the reactor opposite to said space is of ring shape, said passages discharging through the central opening of that ring, a discharge nozzle in line with the opening of the ring, an inlet conduit means for the coolant propellant associated with said nozzle means, said ring being perforated for passage of the coolant-propellant into the vessel laterally of the core.

5. In a nuclear reactor having an internal fuel core for passage of a coolant-propellant therethrough, said core having a coolant-propellant inlet end and exit end, means including a supporting plate spaced from the inlet end of the core to provide a chamber in which the pressure is reduced against the coolant inlet end of said core below the pressure at the coolant exit end of said core so that a negative pressure differential is produced to effect a supporting force on said core by exerting a compressive loading on the core from the exit end towards the inlet end.

6. In a nuclear reactor according to claim 5 wherein said means includes means to variably maintain the pressure against the coolant inlet end of said core below the pressure at the coolant exit end of the core to produce a supporting force on said core.

7. In a nuclear reactor having an internal fuel core for passage of a coolant-propellant therethrough, said core having a coolant inlet and exit end, means including a supporting plate for the core providing a chamber at the coolant inlet end of the core, and means to maintain the pressure in said chamber lower than that existing at the coolant exit end of said core so that the pressure against said inlet end of the core is less than that on the exit end, to produce a negative pressure differential to exert a supporting force on said core.

8. In a nuclear reactor according to claim 7 wherein means are provided to maintain the pressure in said chamber variable and lower than that existing at the coolant exit end of said core so that a negative pressure differential results which produces a force on said core for supporting it within the rocket reactor.

9. In a nuclear rocket reactor having an active fuel core provided with at least one fuel element having an inlet end and an exit end through which a coolant propellant flows from its inlet end through its exit end, supporting means for the core positioned at its upper end, and pressure chamber means located between the said active core and the supporting means for creating a negative pressure differential between the coolant propellant inlet end and coolant propellant exit end of the fuel element in order to support the element or elements comprising the active core of the reactor during operation.

10. That method in the propulsion of a nuclear reactor having an internal fuel core having an inlet end and a liberation end for coaction with a coolant-propellant means for supporting the core from above and a chamber between the supporting means and the top of the core, comprising passing said coolant-propellant through the core from its inlet end to its liberation end, and in reducing the pressure in the chamber on the core at its inlet end with respect to the pressure at its liberation end so that a negative differential pressure is set up to support the core.

References Cited by the Examiner

UNITED STATES PATENTS

| | | | |
|---|---|---|---|
| 2,868,708 | 1/1959 | Vernon | 176—60 X |
| 3,150,054 | 9/1964 | Fox | 176—39 X |
| 3,163,585 | 12/1964 | Metcalfe et al. | 176—87 |

OTHER REFERENCES

Newgard et al: Nuclear Science and Engineering, vol. 7 (1960), pages 377–386.

REUBEN EPSTEIN, *Primary Examiner.*